(12) United States Patent
Usui

(10) Patent No.: US 9,108,609 B2
(45) Date of Patent: Aug. 18, 2015

(54) ELECTRIC MOTOR-DRIVEN BOOSTER

(75) Inventor: Takuya Usui, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 854 days.

(21) Appl. No.: 13/314,761

(22) Filed: Dec. 8, 2011

(65) Prior Publication Data

US 2012/0144823 A1    Jun. 14, 2012

(30) Foreign Application Priority Data

Dec. 9, 2010 (JP) ................. 2010-274664

(51) Int. Cl.
*F15B 7/00* (2006.01)
*B60T 13/74* (2006.01)

(52) U.S. Cl.
CPC ................. *B60T 13/745* (2013.01)

(58) Field of Classification Search
CPC ... B60T 13/745; B60T 13/162; B60T 13/146; B60T 11/20; B60T 8/4086; B60T 7/06; F16D 29/005; B60W 2540/12; B60W 30/18136
USPC ........................................... 60/545
See application file for complete search history.

(56) References Cited

U.S. PATENT DOCUMENTS

| | | |
|---|---|---|
| 2010/0176652 A1 | 7/2010 | Arakawa |
| 2013/0047593 A1 | 2/2013 | Weiberle et al. |

FOREIGN PATENT DOCUMENTS

| | | |
|---|---|---|
| JP | 9-175376 | 7/1997 |
| JP | 2008-30599 | 2/2008 |
| JP | 2008-254586 | 10/2008 |
| JP | 2008-296670 | 12/2008 |
| JP | 2010-184699 | 8/2010 |
| JP | 2013-519553 | 5/2013 |

OTHER PUBLICATIONS

Office Action issued Jun. 11, 2014 in corresponding Japanese patent application No. 2010-274664 (with English translation).

*Primary Examiner* — Edward Look
*Assistant Examiner* — Jason Mikus
(74) *Attorney, Agent, or Firm* — Wenderoth, Lind & Ponack, L.L.P.

(57) ABSTRACT

In normal braking, the operation of an electric motor is controlled according to the amount of operation of a brake pedal to drive a pressing member through a belt drive mechanism and a ball-screw mechanism, thereby pressing a piston to generate a fluid pressure in a master cylinder to obtain a braking force. A predetermined reaction force is applied to the brake pedal by a reaction force spring of a stroke simulator, and a gap is maintained between the pressing member and a movable member, thereby eliminating an uncomfortable feeling in a brake operation caused by fluid pressure variations in the master cylinder. When the electric motor fails, the movable member abuts against the pressing member and directly presses the piston to maintain the braking function. The rear end of the pressing member is inserted into a guide member and the reaction force spring to reduce the axial size.

20 Claims, 9 Drawing Sheets

ELECTRIC MOTOR-DRIVEN BOOSTER

BACKGROUND OF THE INVENTION

The present invention relates to boosters incorporated in brake apparatus for automobiles and other vehicles. More particularly, the present invention relates to an electric motor-driven booster using an electric motor as a boost source.

A publicly known electric motor-driven booster is disclosed, for example, in Japanese Patent Application Publication No. 2008-30599. The electric motor-driven booster has an input rod connected to a brake pedal, a pressing member pressing a piston in a master cylinder, an electric motor driving a booster piston through a rotation-rectilinear motion conversion mechanism, a stroke simulator giving a predetermined reaction force to the input rod, and a controller controlling the operation of the electric motor according to the movement of the input rod. With this structure, the controller controls the operation of the electric motor to propel the piston in the master cylinder through the pressing member according to the amount of operation of the brake pedal, thereby generating a brake fluid pressure to obtain a desired braking force.

In addition, the controller appropriately adjusts the output of the electric motor in accordance with the amount of operation of the brake pedal, thereby enabling the so-called boost ratio to be varied. Thus, it is possible to execute various brake control operations, such as boost control, brake assist control, regenerative cooperative control, and so forth. In this regard, the vehicle driver does not feel uncomfortable even when the output of the electric motor is changed by regenerative cooperative control or the like because the stroke simulator gives a predetermined reaction force to the brake pedal in response to the brake pedal depression.

If the electric motor should become unable to operate due to a failure in the electric system or the like, the pressing member can be pressed directly by the input rod connected to the brake pedal to propel the piston in the master cylinder, thereby enabling the braking function to be maintained.

SUMMARY OF THE INVENTION

The electric motor-driven booster disclosed in the above-described Japanese Patent Application Publication No. 2008-30599 suffers, however, from the following problems. To maintain the braking function in case of a failure in the electric system or the like, the input rod and the pressing member are coaxially disposed, and the stroke simulator is disposed separately. Therefore, there is room for improvement in terms of installation space. If the stroke simulator is simply incorporated into the electric motor-driven booster body as an integral part thereof, the axial size becomes undesirably long.

The present invention has been made in view of the above-described circumstances. Accordingly, an object of the present invention is to provide an electric motor-driven booster improved in space efficiency.

To solve the above-described problems, the present invention provides an electric motor-driven booster having an electric motor operating in response to an operation of an input rod connected to a brake pedal, and a propulsion mechanism driven by the electric motor to propel a piston in a master cylinder. The electric motor and the propulsion mechanism are provided in a housing. The electric motor-driven booster has a pressing member provided between the piston and the propulsion mechanism movably relative to the propulsion mechanism. The pressing member is moved by the input rod or the propulsion mechanism to press the piston. The electric motor-driven booster further has a reaction force generating mechanism supported by the housing and connected with the input rod to apply a reaction force against the operation of the input rod. The pressing member and the reaction force generating mechanism are disposed to overlap each other in an axial direction.

The electric motor-driven booster according to the present invention makes it possible to increase the space efficiency.

DETAILED DESCRIPTION OF THE INVENTION

Embodiments of the present invention will be explained below in detail with reference to the accompanying drawings.

Figure 1:
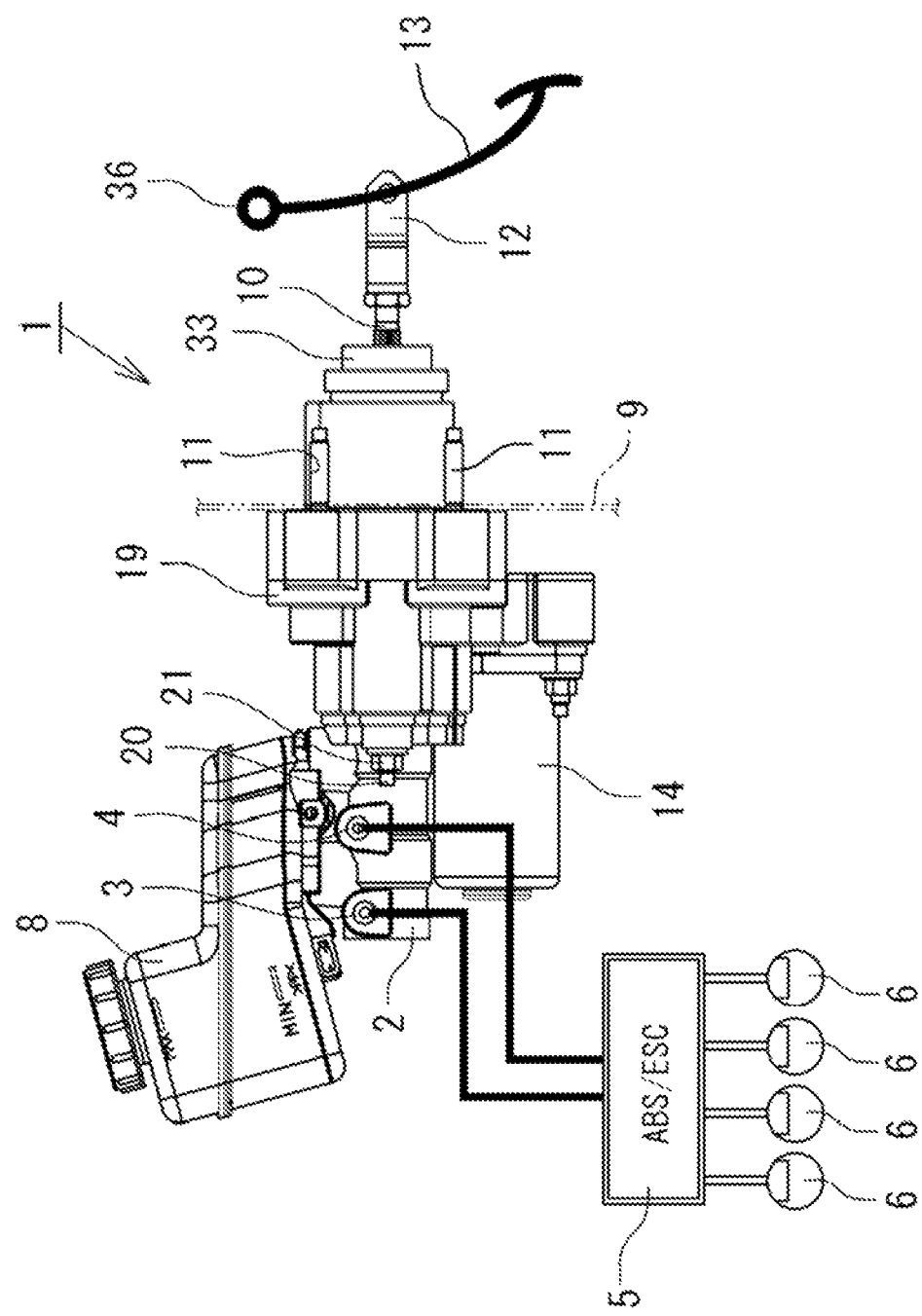
FIG. 1 is a side view of an electric motor-driven booster according to a first embodiment of the present invention.
Figure 2:
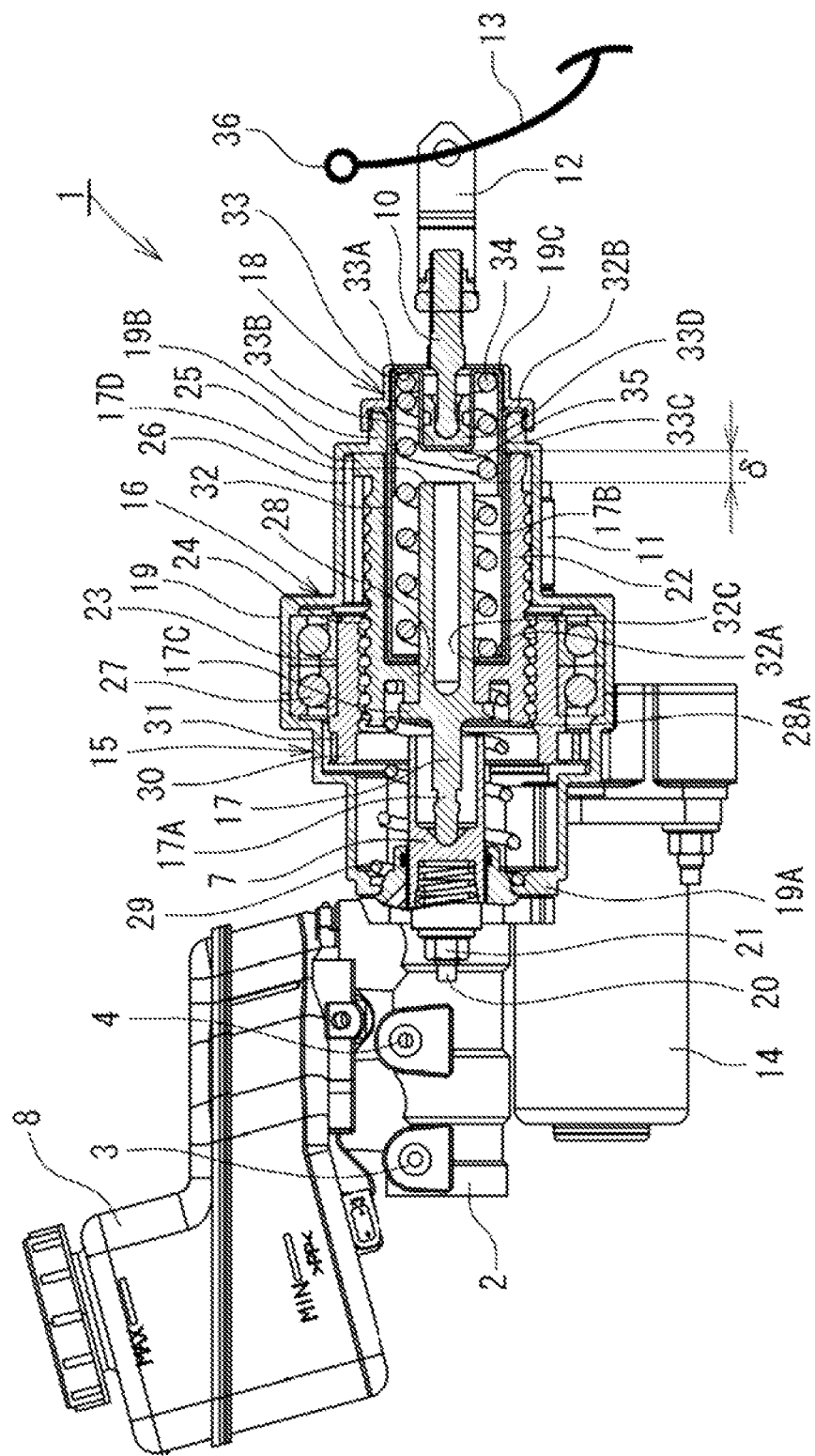
FIG. 2 is a vertical sectional side view of the electric motor-driven booster shown in FIG. 1.

A first embodiment of the present invention will be explained with reference to FIGS. 1 to 4. As shown in FIGS. 1 and 2, an electric motor-driven booster 1 according to this embodiment is connected to a master cylinder 2. The master cylinder 2 is a tandem master cylinder, which has two fluid pressure ports (primary and secondary) 3 and 4. The fluid pressure ports 3 and 4 are connected with fluid pressure-operated brake devices 6, which are provided for four wheels, respectively, through a fluid pressure control unit 5 having fluid pressure circuits of two systems. The brake devices 6 may be publicly known disk brakes or drum brakes, for example, which generate a braking force by fluid pressure. It should be noted that, in the following description, the terms "front" and "forward" as used herein shall mean the forward direction of the vehicle, and the terms "rear" and "rearward" as used herein shall mean the reverse direction of the vehicle.

The tandem master cylinder 2 is fitted with a pair of pistons (primary and secondary) 7 disposed in series (only the primary piston is shown). Advancing of these pistons 7 causes the same fluid pressure to be supplied from the two fluid pressure ports 3 and 4. When the pistons 7 retract, the master cylinder 2 is appropriately replenished with brake fluid from a reservoir 8 according to wear of brake pads or the like. If either one of the fluid pressure circuits of the two systems should fail, the other fluid pressure circuit is supplied with fluid pressure. Therefore, the braking function can be maintained.

The fluid pressure control unit 5 has an electric motor-driven pump serving as a fluid pressure source and electromagnetic control valves such as pressure increasing valves and pressure reducing valves and performs the following control by appropriately executing a pressure reducing mode for reducing the fluid pressure to be supplied to the brake device 6 of each wheel, a pressure maintaining mode for maintaining the fluid pressure, and a pressure increasing mode for increasing the fluid pressure.

(1) Braking force distribution control to control braking force to be applied to each wheel so as to appropriately distribute braking force to each wheel according to the ground load and so forth during braking.

(2) Anti-lock brake control to prevent locking of wheels by automatically adjusting braking force for each wheel during braking.

(3) Vehicle stability control to stabilize behavior of the vehicle through suppression of under steer and over steer by detecting side slip of wheels during running and automatically applying braking force to each wheel appropriately.

(4) Hill start assist control to assist starting on a gradient (up gradient in particular) with the vehicle kept braked.

(5) Traction control to prevent wheel spin at the time of starting and so forth.

(6) Vehicle following control to maintain a predetermined distance between the vehicle concerned and a vehicle ahead, and lane deviation avoidance control to keep the vehicle in the driving lane.

(7) Obstacle avoidance control to avoid collision with an obstacle.

The electric motor-driven booster 1 is installed to extend through a dash panel 9 (see FIG. 1), which is a partition dividing an engine room and the vehicle compartment from each other. The master cylinder 2-side part of the electric motor-driven booster 1 is disposed in the engine room, and the input rod 10-side part thereof, which is opposite to the master cylinder 2-side part, is disposed in the vehicle compartment. The electric motor-driven booster 1 is secured to the dash panel 9 with stud bolts 11. A brake pedal 13 is connected to the input rod 10 through a clevis 12.

The electric motor-driven booster 1 has an electric motor 14 for driving the piston 7 of the master cylinder 2, a ball-screw mechanism 16, which is a rotation-rectilinear motion conversion mechanism, serving as a propulsion mechanism driven by the electric motor 14 through a belt drive mechanism 15, a pressing member 17 propelled by the ball-screw mechanism 16 to press the piston 7, and a stroke simulator 18 serving as a reaction force generating mechanism connected to the input rod 10. The ball-screw mechanism 16, the pressing member 17 and the stroke simulator 18 are coaxially disposed and accommodated in a substantially circular cylindrical housing 19. The master cylinder 2 is connected to one end 19A of the housing 19 by using stud bolts 20 and nuts 21. The input rod 10 projects out of the other end 19B of the housing 19. The electric motor 14 is disposed at a side of the hall-screw mechanism 16 and connected to the housing 19.

The pressing member 17 is disposed rearward of and coaxially with the piston 7 and has an integral structure comprising a distal end-side rod portion 17A inserted into a circular cylindrical rear end portion of the piston 7 to press the piston 7, a proximal end-side circular cylindrical portion 17B, and a large-diameter flange portion 17C disposed between the rod portion 17A and the cylindrical portion 17B.

The ball-screw mechanism 16 has a hollow structure having a circular cylindrical rectilinearly moving member 22, a circular cylindrical rotating member 23 having the rectilinearly moving member 22 inserted therein, and a plurality of balls 24 (steel balls) serving as rolling elements, which are loaded in spiral screw grooves formed between the rectilinearly moving member 22 and the rotating member 23. The rectilinearly moving member 22 is supported axially movably in the housing 19 but non-rotatably about the axis through engagement of a radially outwardly projecting anti-rotation detent portion 25 with a guide groove 26 formed in the housing 19. The rotating member 23 is supported rotatably about the axis but axially immovably by bearings 27 in the housing 19. Rotating the rotating member 23 allows the balls 24 to roll in the screw grooves, thereby causing the rectilinearly moving member 22 to move axially.

The rectilinearly moving member 22 has the cylindrical portion 17B and flange portion 17C of the pressing member 17 inserted therein. The cylindrical portion 17B is axially slidably supported by a guide portion 28 formed in the rectilinearly moving member 22. The flange portion 17C abuts against an axial end surface 28A of the guide portion 28. The abutment allows the rectilinearly moving member 22 to press the flange portion 17C when advancing toward the master cylinder 2. Consequently, the pressing member 17 advances together with the rectilinearly moving member 22, and the rod portion 17A presses the piston 7 of the master cylinder 2. In addition, when the flange portion 17C separates from the rectilinearly moving member 22, the pressing member 17 can advance alone without being accompanied by movement of the rectilinearly moving member 22. The cylindrical portion 17B, which is a part of the pressing member 17 supported by the guide portion 28, has a length greater than the maximum propulsion length of the piston 7 of the master cylinder 2. A return spring 29, which is a tapered compression coil spring, is interposed between the one end 19A of the housing 19 and the rectilinearly moving member 22. The return spring 29 constantly urges the rectilinearly moving member 22 toward the other end 19B of the housing 19, i.e. toward the brake pedal 13, or rearward.

The rotating member 23 has a pulley 30 integrally formed at the front end thereof. A belt 31 is passed over the pulley 30 and a pulley (not shown) mounted on an output shaft of the electric motor 14. The two pulleys and the belt constitute a belt drive mechanism 15, through which the rotating member 23 is rotationally driven by the electric motor 14. It should be noted that the belt drive mechanism 15 may be combined with a speed reduction mechanism such as a gear speed reduction mechanism. The belt drive mechanism 15 may be replaced by other publicly known drive mechanisms such as a gear drive mechanism, or a chain drive mechanism. The rotating member 23 may be directly driven by the electric motor 14 without using a drive mechanism.

The electric motor 14 may be a publicly known DC motor, DC brushless motor, or AC motor, for example. In this embodiment, a DC brushless motor is used from the viewpoint of controllability, silence, durability and so forth.

The stroke simulator 18 is inserted into the rectilinearly moving member 22 from the rear end of the latter and secured in the housing 19 by a cap 19C attached to the other end 19B of the housing 19, which is a rear end thereof. The stroke simulator 18 has a guide member 32 in the shape of a circular cylinder, one end of which is closed, and a movable member 33 in the shape of a circular cylinder, one end of which is closed. The movable member 33 is axially slidably inserted in the guide member 32. The stroke simulator 18 further has a reaction force spring 34, which is a compression coil spring, interposed between a bottom 32A of the guide member 32 and a bottom 33A of the movable member 33.

The guide member 32 has a bottom 32A-side part thereof inserted into the cylindrical rectilinearly moving member 22 from the rear end of the latter, and an outer flange portion 32B formed at the opening end of the guide member 32 is abutted against the other end 19B of the housing 19. In this state, the guide member 32 is secured to the housing 19 by the cap 19C. The guide member 32 has the rear end of the cylindrical portion 17B of the pressing member 17 inserted thereinto from an opening 32C of the bottom 32A thereof. Thus, the cylindrical portion 17B extends into the guide member 32. In other words, the pressing member 17 and the stroke simulator 18 are disposed to overlap each other in the axial direction. More specifically, the pressing member 17 and the stroke simulator 18 are disposed so that an axial part of the outer peripheral surface of the cylindrical portion 17B of the pressing member 17 faces an axial part of the inner peripheral surface of the guide member 32 of the stroke simulator 18. In other words, the pressing member 17 and the stroke simulator 18 are disposed so that the wall thickness of the cylindrical portion 17B of the pressing member 17 and the wall thickness of the guide member 32 of the stroke simulator 18 are superimposed with a gap therebetween in the radial direction of the cylindrical portion 17B and the guide member 32. Further, regarding the positional relationship between the cylindrical portion 17B of the pressing member 17 and the reaction force spring 34, the reaction force spring 34 is supported at one end thereof by the housing 19 through the guide member 32, and the proximal end of the pressing member 17 is disposed closer to the input rod 10 than the one end of the reaction force spring 34. In addition, the reaction force spring 34 is disposed between the cylindrical portion 17B and the guide member 32 in the radial direction of the cylindrical portion 17B and the guide member 32. Consequently, the pressing member 17 and the reaction force spring 34 are disposed so that an axial part of the outer peripheral surface of the cylindrical portion 17B faces an axial part of the inner diameter side of the reaction force spring 34. In other words, the pressing member 17 and the reaction force spring 34 are disposed so that the wall thickness of the cylindrical portion 17B and the coil diameter of the reaction force spring 34 are superimposed with a gap therebetween in the radial direction of the cylindrical portion 17B and the reaction force spring 34.

The movable member 33 has a rod receiving portion 33B projecting from the inner periphery of the bottom 33A forward, i.e. toward the bottom 32A of the guide member 32. In addition, the movable member 33 has a sliding tubular portion 33C projecting from the outer periphery of the bottom 33A forward, i.e. toward the bottom 32A of the guide member 32. The outer peripheral surface of the sliding tubular portion 33C slides along the inner peripheral surface of the guide member 32. A rod receiving member 35 is fitted and secured in the rod receiving portion 33B. The distal end of the input rod 10 is connected to the rod receiving member 35. The rod receiving portion 33B of the movable member 33 is disposed in coaxial relation to the cylindrical portion 17B of the pressing member 17. A rear end surface 17D of the cylindrical portion 17B and a distal end surface 33D of the rod receiving portion 33B face each other in the cylindrical rectilinearly moving member 22. The retracting position of the movable member 33 is limited by abutment of the bottom 33A against the cap 19C. When the movable member 33 is in a non-braking position (i.e. the most retracting position where the bottom 33A abuts against the cap 19C) shown in FIG. 2, a predetermined gap δ is formed between the distal end surface 33D of the rod receiving portion 33B and the rear end surface 17D of the cylindrical portion 17B of the pressing member 17.

The electric motor-driven booster 1 is provided with various sensors such as an input sensor 36 detecting an amount of operation of the brake pedal 13, an output sensor (not shown) detecting a displacement of the ball-screw mechanism 16 (an angle of rotation of the rotating member 23 or a displacement of the rectilinearly moving member 22) or an angle of rotation of the electric motor 14, and a fluid pressure sensor (not shown) detecting a fluid pressure in the master cylinder 2. In addition, the electric motor-driven booster 1 is provided with a controller (not shown) controlling the operation of the electric motor 14 on the basis of data detected by these sensors.

The following is an explanation of the operation of this embodiment arranged as stated above.

(Normal Braking)

Figure 3:
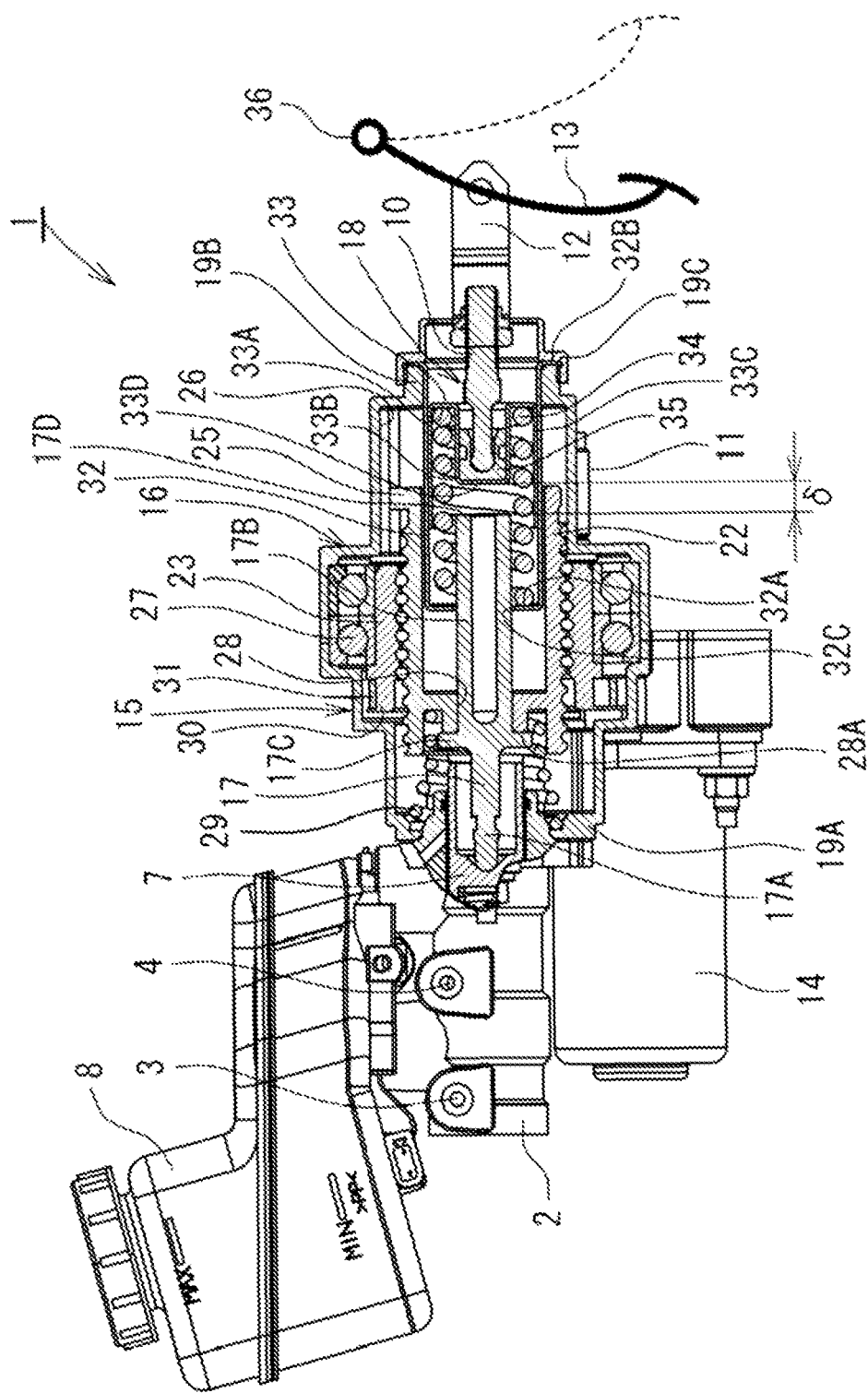
FIG. 3 is a vertical sectional side view of the electric motor-driven booster in FIG. 1, showing the booster in normal braking operation.

In normal braking, when the driver operates the brake pedal 13, as shown in FIG. 3, the input sensor 36 detects the amount of operation of the brake pedal 13, and the controller controls the operation of the electric motor 14 according to the amount of operation of the brake pedal 13 while monitoring data detected by the output sensor. The electric motor 14 drives the ball-screw mechanism 16 through the belt drive mechanism 15 to advance the rectilinearly moving member 22 against the spring force of the return spring 29, causing the pressing member 17 to press the piston 7 to generate a fluid pressure in the master cylinder 2, and a fluid pressure is supplied through the fluid pressure control unit 5 to the brake device 6 of each wheel to generate a braking force. At this time, the gap δ is maintained between the distal end surface 33D of the rod receiving portion 33B of the movable member 33 and the rear end surface 17D of the cylindrical portion 17B of the pressing member 17. At this time, further, the brake pedal 13 is given a predetermined reaction force by the spring force of the reaction force spring 34 of the stroke simulator 18 according to the amount of operation of the brake pedal 13. Therefore, the driver can generate a desired braking force by adjusting the amount of operation of the brake pedal 13.

In addition, the controller can execute regenerative cooperative control by varying the control quantity of the electric motor 14 with respect to the amount of operation of the brake pedal 13. That is, a hybrid automobile or an electric automobile performs regenerative braking in which a dynamo is driven by the rotation of a wheel during deceleration to recover kinetic energy as electric power. During the regenerative braking, the controller reduces the fluid pressure in the master cylinder 2 by an amount corresponding to the braking force generated by the regenerative braking to obtain a desired braking force. In this case also, the distal end surface 33D of the rod receiving portion 33B and the rear end surface 17D of the cylindrical portion 17B of the pressing member 17 do not abut against each other, but the gap δ is maintained, although not a fixed quantity. In this case, even when the fluid pressure in the master cylinder 2 changes by an amount corresponding to the braking force generated by the regenerative braking, the deceleration of the vehicle corresponds to the amount of operation of the brake pedal 13. Therefore, the reaction force applied to the brake pedal 13 by the reaction force spring 34 of the stroke simulator 18 will not make the driver feel uncomfortable.

(In Case of Failure)

Figure 4:
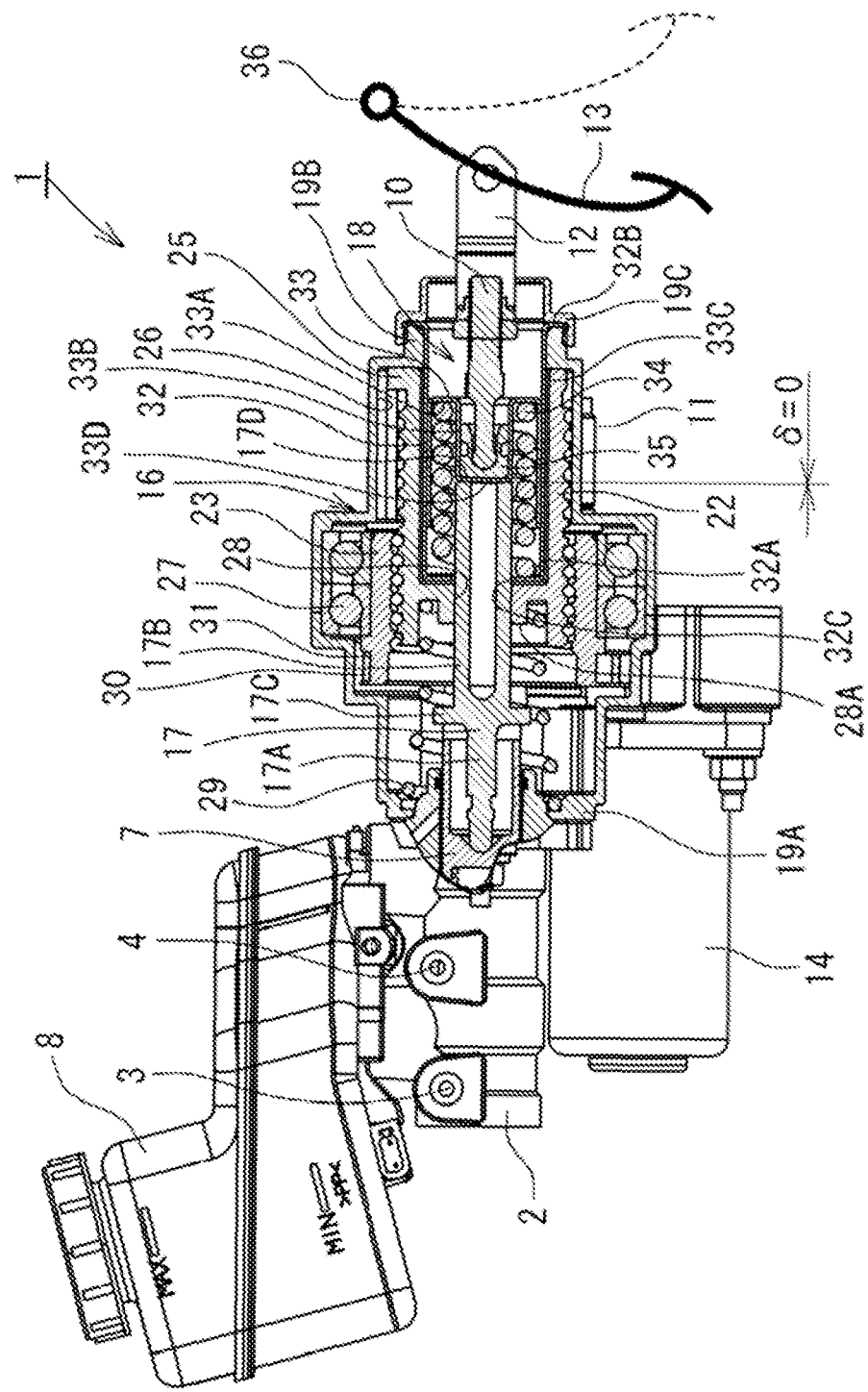
FIG. 4 is a vertical sectional side view of the electric motor-driven booster in FIG. 1, showing the booster in braking operation upon a failure of an electric motor thereof.

In the event that it becomes impossible to perform the control by the electric motor 14 due to a failure in the electric motor 14, the controller, or the ball-screw mechanism 16, for example, even if the driver operates the brake pedal 13, as shown in FIG. 4, the electric motor 14 will not operate, and the rectilinearly moving member 22 of the ball-screw mechanism 16 will not advance. Accordingly, the distal end surface 33D of the rod receiving portion 33B of the movable member 33 abuts against the rear end surface 17D of the cylindrical portion 17B of the pressing member 17 (δ=0). If the brake pedal 13 is further depressed, the rod receiving portion 33B of the movable member 33 directly presses the cylindrical portion 17B, causing the flange portion 17C to separate from the end portion of the rectilinearly moving member 22. Consequently, the pressing member 17 advances, and the rod portion 17A presses the piston 7 of the master cylinder 2. Thus, it is possible to advance the piston 7 by only the operation of the brake pedal 13 and hence possible to generate a fluid pressure in the master cylinder 2 and thus maintain the braking function. At this time, because the pressing member 17 can advance relative to the rectilinearly moving member 22, the spring force of the return spring 29 will not act on the brake pedal 13. Therefore, the driver can operate the brake pedal 13 without the need to apply an unnecessary depressing force.

In the electric motor-driven booster 1, the rear end of the cylindrical portion 17B of the pressing member 17 is inserted into the guide member 32 of the stroke simulator 18 so that the cylindrical portion 17B and the guide member 32 overlap each other in the axial direction. Therefore, the axial size of the electric motor-driven booster 1 can be reduced, and the space efficiency can be increased.

Next, a second embodiment of the present invention will be explained with reference to FIGS. 5 to 9. It should be noted that members or portions in the second embodiment that are similar to those of the above-described first embodiment are denoted by the same reference numerals as those used in the first embodiment, and that only points in which the second embodiment differs from the first embodiment will be explained in detail.

Figure 5:
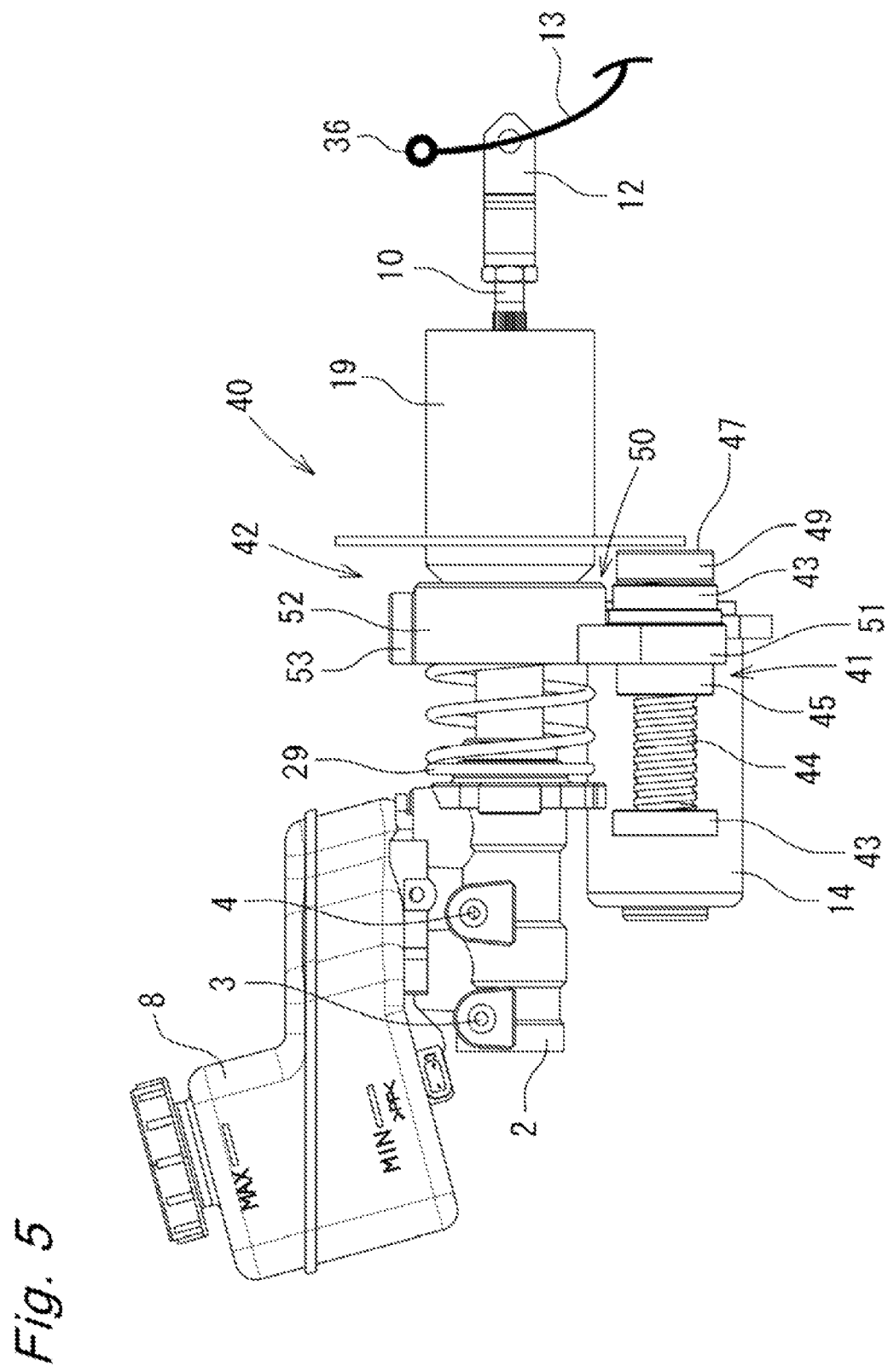
FIG. 5 is a side view of an electric motor-driven booster according to a second embodiment of the present invention.
Figure 6:
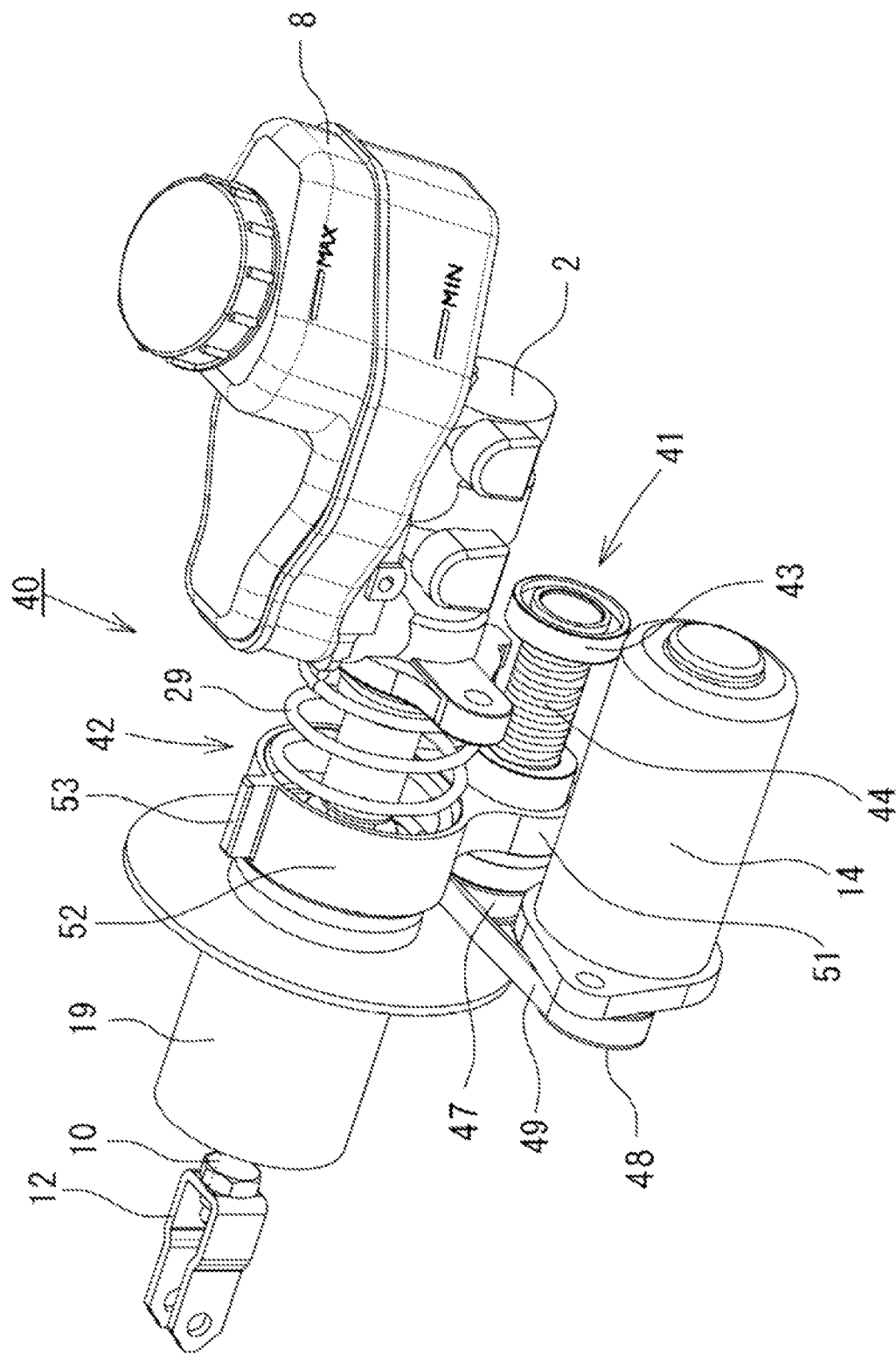
FIG. 6 is a perspective view of a front part of the electric motor-driven booster shown in FIG. 5.
Figure 7:
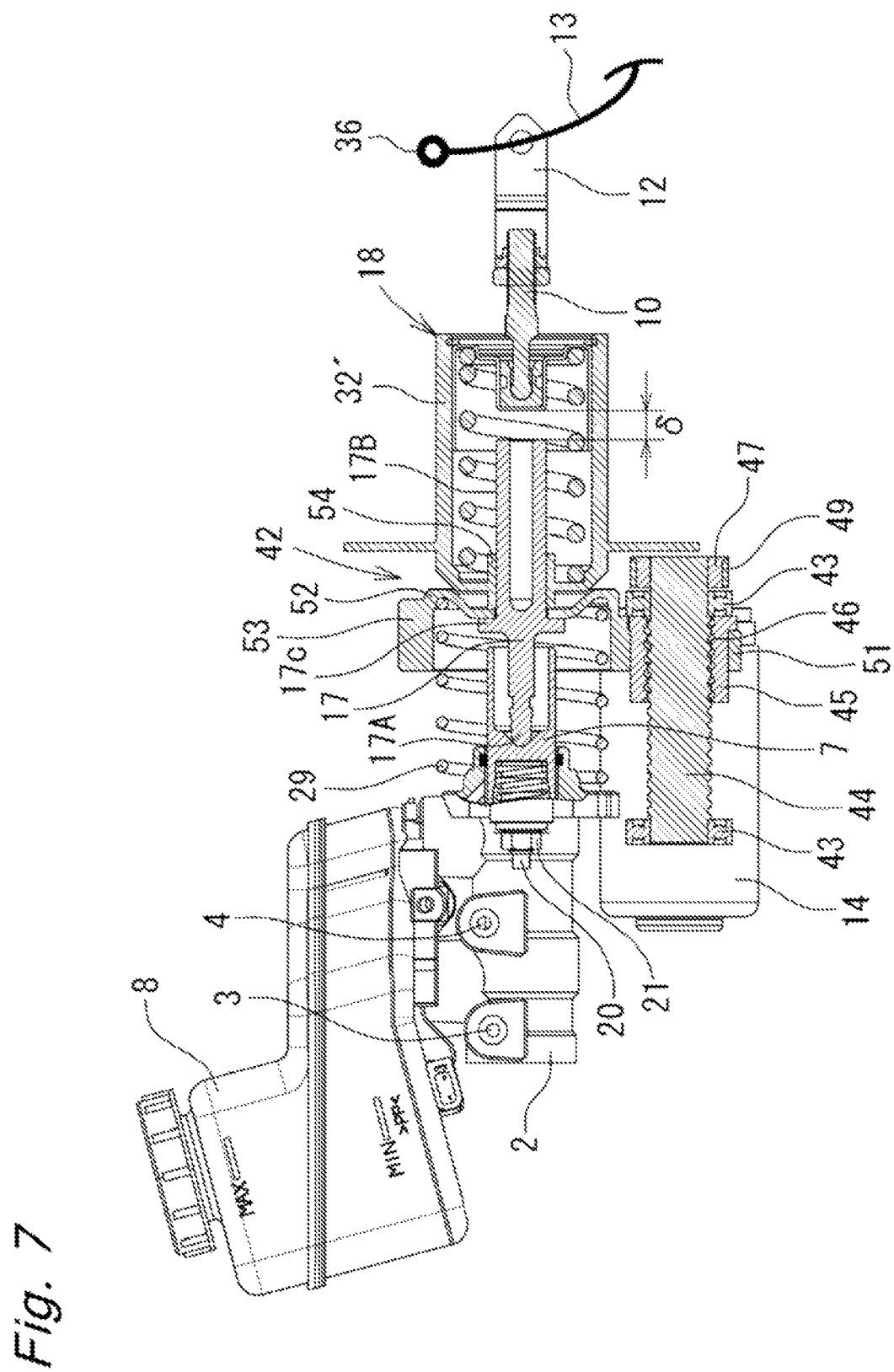
FIG. 7 is a vertical sectional side view of the electric motor-driven booster shown in FIG. 5.

As shown in FIGS. 5 to 7, an electric motor-driven booster 40 according to the second embodiment has a ball-screw mechanism 41 disposed at a side of the pressing member 17. The ball-screw mechanism 41 moves the pressing member 17 through a link mechanism 42. The ball-screw mechanism 41 has a rotating shaft member 44 disposed below the piston 7 of the master cylinder 2 and the pressing member 17 in parallel to the output shaft of the electric motor 14. The rotating shaft member 44 is supported by the housing 19 through bearings 43 rotatably but axially immovably. The ball-screw mechanism 41 further has a rectilinearly moving member 45 fitted therein with the rotating shaft member 44 and supported axially movably but non-rotatably about the axis. Further, the ball-screw mechanism 41 has a plurality of balls 46 (steel balls) loaded in spiral screw grooves formed between the rotating shaft member 44 and the rectilinearly moving member 45. Rotating the rotating shaft member 44 allows the balls 46 to roll in the screw grooves, thereby causing the rectilinearly moving member 45 to move axially.

A pulley 47 is mounted on an one end of the rotating shaft member 44, and a belt 49 is passed over the pulley 47 and a pulley 48 (see FIG. 6) mounted on the output shaft of the electric motor 14. The pulleys 47 and 48 and the belt 49 constitute a belt drive mechanism, through which the rotating shaft member 44 is rotationally driven by the electric motor 14.

The link mechanism 42 has a substantially gourd-shaped link member 50 disposed between the pressing member 17 and the rectilinearly moving member 45. The link member 50 has a connecting portion 51 connected to the outer periphery of the rectilinearly moving member 45 non-rotatably relative to the rectilinearly moving member 45. The link member 50 further has a cup-shaped propelling portion 52. The propelling portion 52 has an anti-rotation detent portion 53 formed above a rear portion of the piston 7 of the master cylinder 2. The detent portion 53 is disposed perpendicular to the axis of the piston 7. The detent portion 53 is supported by a support portion (not shown) of the housing 19 movably in the axial direction of the piston 7 but immovably in the circumferential direction of the piston 7. Thus, the link member 50 is supported so that the rectilinearly moving member 45 will not rotate about the axis thereof.

The stroke simulator 18 has a guide member 32' formed as an integral part of the housing 19. The guide member 32' has a circular cylindrical portion 54 formed in the bottom thereof. The cylindrical portion 54 guides the cylindrical portion 17B of the pressing member 17 movably in the axial direction. The cylindrical portion 17B of the pressing member 17 is inserted into an opening in the center of the propelling portion 52, and the propelling portion 52 abuts against the rear end of the flange portion 17C of the pressing member 17. The return spring 29 is interposed between the rear end of the master cylinder 2 and the propelling portion 52.

Thus, the rectilinear motion of the rectilinearly moving member 45 allows the propelling portion 52 to press the flange portion 17C of the pressing member 17, causing the pressing member 17 to advance. Consequently, the rod portion 17A of the pressing member 17 presses the piston 7. When the flange portion 17C separates from the propelling portion 52, the pressing member 17 can advance alone without being accompanied by movement of the propelling portion 52.

The following is an explanation of the operation of this embodiment arranged as stated above.

(Normal Braking)

Figure 8:
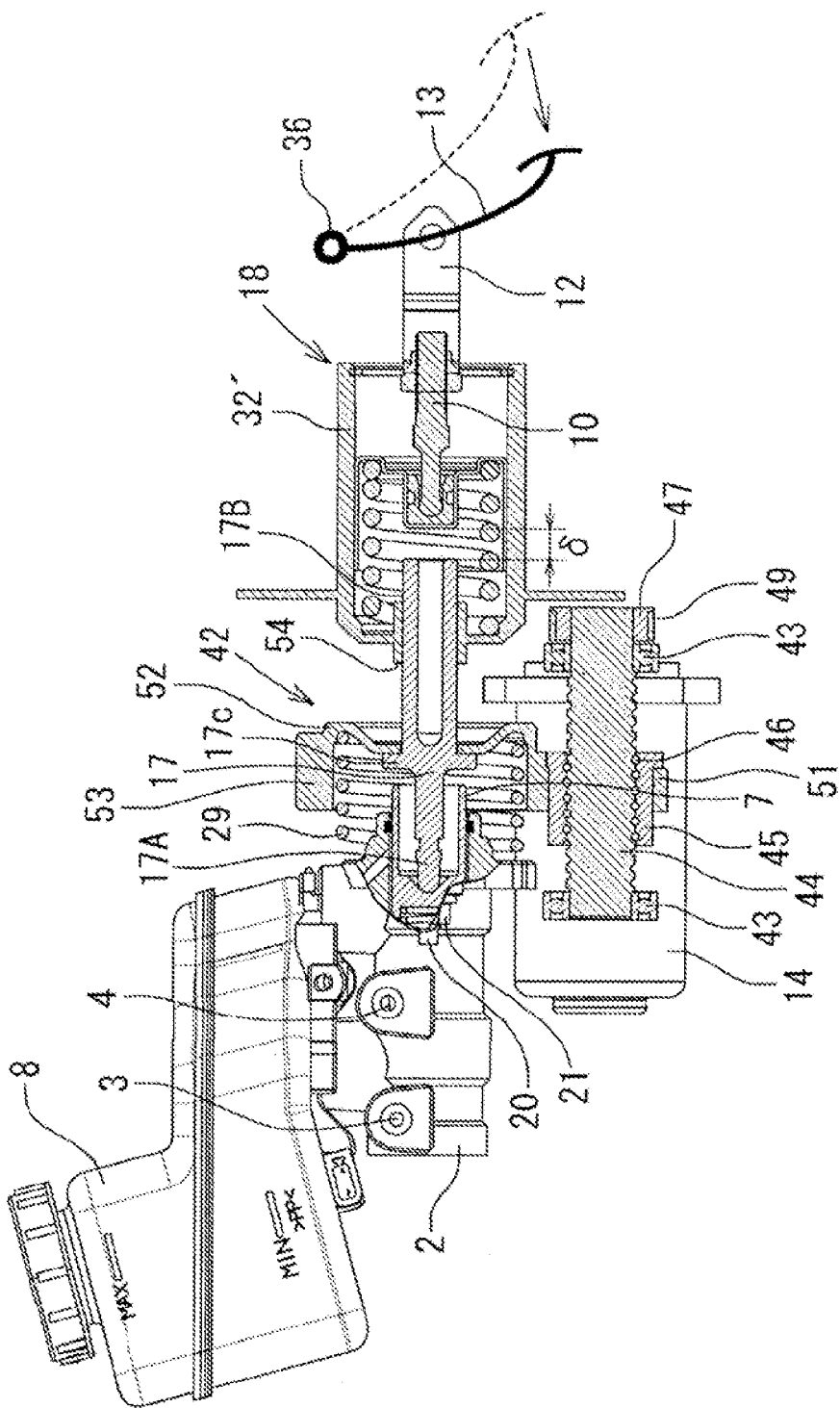
FIG. 8 is a vertical sectional side view of the electric motor-driven booster in FIG. 5, showing the booster in normal braking operation.

In normal braking, when the driver operates the brake pedal 13, as shown in FIG. 8, the input sensor 36 detects the amount of operation of the brake pedal 13, and the controller controls the operation of the electric motor 14 according to the amount of operation of the brake pedal 13 while monitoring data detected by the output sensor. The electric motor 14 drives the ball-screw mechanism 41 through the belt drive mechanism to move the rectilinearly moving member 45, causing the propelling portion 52 to move through the link mechanism 42 against the spring force of the return spring 29, and thus causing the pressing member 17 to press the piston 7. Consequently, a fluid pressure is generated in the master cylinder 2, and a fluid pressure is supplied to the brake device 6 of each wheel. Thus, a desired braking force can be generated. When a control process such as boost control, brake assist control, or regenerative cooperative control is executed, the stroke simulator 18 applies a predetermined reaction force to the brake pedal 13 to prevent the driver from feeling uncomfortable even when the fluid pressure in the master cylinder 2 varies.

(In Case of Failure)

Figure 9:
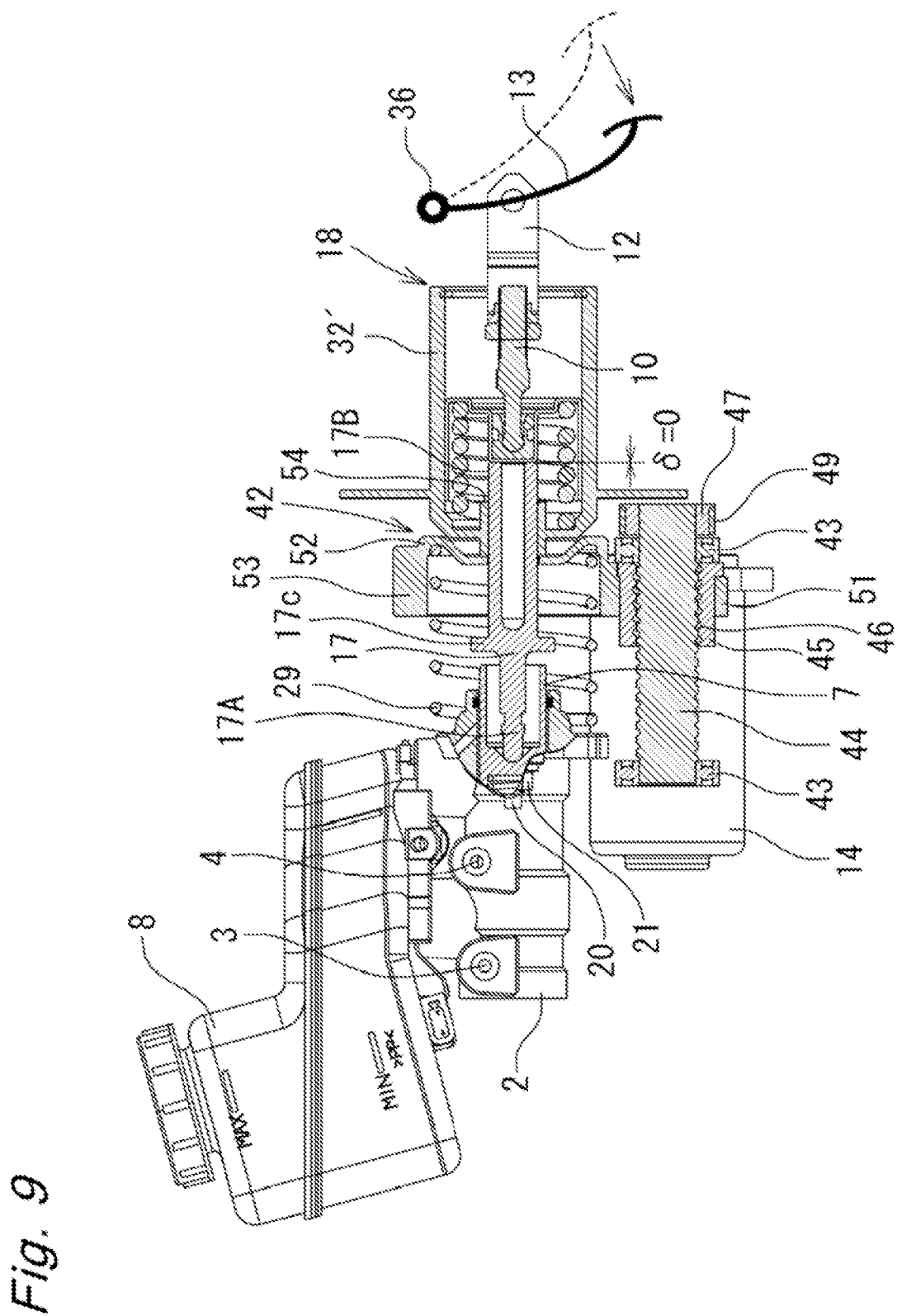
FIG. 9 is a vertical sectional side view of the electric motor-driven booster in FIG. 5, showing the booster in braking operation upon a failure of an electric motor thereof.

In the event that it becomes impossible to perform the control by the electric motor 14 due to a failure in the electric motor 14, the controller, the ball-screw mechanism 41, or the link mechanism 42, for example, even if the driver operates the brake pedal 13, as shown in FIG. 9, the electric motor 14 will not operate, and the propelling portion 52 will not advance. Accordingly, the distal end of the rod receiving portion 33B of the movable member 33 abuts against the rear end of the cylindrical portion 17B of the pressing member 17 (δ=0). If the brake pedal 13 is further depressed, the rod receiving portion 33B of the movable member 33 presses the cylindrical portion 17B, causing the flange portion 17C to separate from the propelling portion 52. Consequently, the pressing member 17 advances, and the rod portion 17A presses the piston 7 of the master cylinder 2. Thus, it is possible to advance the piston 7 by only the operation of the brake pedal 13 and hence possible to generate a fluid pressure in the master cylinder 2 and thus maintain the braking function, in the same way as in the foregoing first embodiment.

In addition, the rear end of the cylindrical portion 17B of the pressing member 17 is inserted into the guide member 32' of the stroke simulator 18 so that the cylindrical portion 17B and the guide member 32' overlap each other in the axial direction. Therefore, the axial size of the electric motor-driven booster 40 can be reduced, and the space efficiency can be increased.

The foregoing first and second embodiments may be arranged such that the guide member 32 (32') of the stroke simulator 18 is inserted in the cylindrical portion 17B of the pressing member 17, and that the movable member 33 is guided along the outer periphery of the guide member 32 (32') to face the cylindrical portion 17B.

The electric motor-driven booster of each of the foregoing embodiments has an electric motor operating in response to an operation of an input rod connected to a brake pedal, and an assist mechanism driven by the electric motor to propel a piston in a master cylinder. The electric motor and the assist mechanism are provided in a housing. The electric motor-driven booster further has a pressing member provided between the piston and the assist mechanism movably relative to the assist mechanism. The pressing member is moved by the input rod or the assist mechanism to press the piston. Further, the electric motor-driven booster has a reaction force generating mechanism supported by the housing and connected with the input rod to apply a reaction force against the operation of the input rod. The pressing member and the reaction force generating mechanism are disposed to overlap each other in the axial direction. This electric motor-driven booster makes it possible to reduce the axial size thereof and to increase the space efficiency.

In the electric motor-driven booster of the foregoing embodiments, the pressing member is inserted in the reaction force generating mechanism. It should, however, be noted that the pressing member need not necessarily be inserted in the reaction force generating mechanism but may be disposed at the outer periphery of the reaction force generating mechanism so as to overlap the reaction force generating mechanism in the axial direction.

In the electric motor-driven booster of the foregoing embodiments, the pressing member is slidably supported by a guide part provided closer to the master cylinder than the reaction force generating mechanism. The guide part may be provided on the housing. With this electric motor-driven booster, the brake pedal can be operated without the need to apply an unnecessary depressing force in the event of a failure in the electric motor. The assist mechanism may be a hollow rotation-rectilinear motion conversion mechanism provided in the housing in coaxial relation to the pressing member, and the guide part may be provided on a rectilinearly moving member of the rotation-rectilinear motion conversion mechanism. This electric motor-driven booster allows the pressing member to advance relative to the rectilinearly moving member. When the rectilinearly moving member is being urged by a return spring, the spring force of the return spring will not act on the brake pedal in the event of a failure in the electric motor. Accordingly, the brake pedal can be operated without the need to apply an unnecessary depressing force. It should be noted that the pressing member need not necessarily be slidably supported by a guide part provided closer to the master cylinder than the reaction force generating mechanism. The guide part may be provided in the reaction force generating mechanism.

In the electric motor-driven booster of the foregoing embodiments, the assist mechanism is a hollow rotation-rectilinear motion conversion mechanism provided in the housing in coaxial relation to the pressing member, and the reaction force generating mechanism and a rectilinearly moving member of the rotation-rectilinear motion conversion mechanism are disposed to overlap each other in the axial direction. With this electric motor-driven booster, the axial size thereof can be further reduced, and the space efficiency can be further increased. The reaction force generating mechanism may be inserted in the rectilinearly moving member of the rotation-rectilinear motion conversion mechanism. Alternatively, the reaction force generating mechanism may be disposed at the outer periphery of the rectilinearly moving member of the rotation-rectilinear motion conversion mechanism.

In the electric motor-driven booster of the foregoing embodiments, the assist mechanism has a propelling member abutting against the pressing member, and a rotation-rectilinear motion conversion mechanism having a rectilinearly moving member rectilinearly moving along an axis disposed parallel to the axis of the pressing member. The assist mechanism further has a link member causing the propelling member to move by rectilinear movement of the rectilinearly moving member.

In the electric motor-driven booster of the foregoing embodiments, the pressing member is disposed to face the input rod across an axial gap at least when the brake pedal is not operated.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2010-274664, filed on Dec. 9, 2010. The entire disclosure of Japanese Patent Application No. 2010-274664, filed on Dec. 9, 2010 including specification, claims, drawings and summary is incorporated herein by reference in its entirety.

What is claimed is:

1. An electric motor-driven booster having an electric motor operating in response to an operation of an input rod connected to a brake pedal, and a propulsion mechanism driven by the electric motor to propel a piston in a master cylinder, the electric motor and the propulsion mechanism being provided in a housing, the electric motor-driven booster comprising:
 a pressing member provided between the piston and the propulsion mechanism, the pressing member being movable relative to a rectilinearly moving member of the propulsion mechanism, the pressing member being movable by either one of the input rod and the propulsion mechanism to press the piston at a distal end of the pressing member; and
 a reaction force generating mechanism supported by the housing and connected with the input rod to apply a reaction force against the operation of the input rod,
 the pressing member being movable together with the rectilinearly moving member by the propulsion mechanism with a gap between the input rod and the pressing member, or caused to abut against the input rod due to movement of the input rod and moved while separated from the rectilinearly moving member, and
 the pressing member and the reaction force generating mechanism being disposed so as to overlap each other in an axial direction.

2. The electric motor-driven booster of claim 1, wherein the pressing member has a proximal end disposed in the reaction force generating mechanism.

3. The electric motor-driven booster of claim 1, wherein the pressing member is slidably supported by a guide part provided closer to the master cylinder than the reaction force generating mechanism.

4. The electric motor-driven booster of claim 3, wherein the guide part is provided on the housing.

5. The electric motor-driven booster of claim 3, wherein the propulsion mechanism is a hollow rotation-rectilinear motion conversion mechanism provided in the housing on a same axis as the pressing member;
the guide part being provided on the rectilinearly moving member of the rotation-rectilinear motion conversion mechanism.

6. The electric motor-driven booster of claim 3, wherein a part of the pressing member that is supported by the guide part has a length greater than a maximum propulsion length of the piston of the master cylinder.

7. The electric motor-driven booster of claim 1, wherein the propulsion mechanism is a hollow rotation-rectilinear motion conversion mechanism provided in the housing on a same axis as the pressing member;
the reaction force generating mechanism and the rectilinearly moving member of the rotation-rectilinear motion conversion mechanism being disposed so as to overlap each other in the axial direction.

8. The electric motor-driven booster of claim 7, wherein the reaction force generating mechanism has one end disposed inside the rectilinearly moving member of the rotation-rectilinear motion conversion mechanism.

9. The electric motor-driven booster of claim 1, wherein the propulsion mechanism has:
a propelling member abutting against the pressing member;
a rotation-rectilinear motion conversion mechanism having the rectilinearly moving member which is rectilinearly movable along an axis disposed parallel to an axis of the pressing member; and
a link member causing the propelling member to move by rectilinear movement of the rectilinearly moving member.

10. The electric motor-driven booster of claim 1, wherein the pressing member is disposed so as to face the input rod across the gap at least when the brake pedal is not operated.

11. The electric motor-driven booster of claim 1, wherein the reaction force generating mechanism has a coil spring, the coil spring being disposed so as to overlap the pressing member.

12. An electric motor-driven booster comprising:
a housing attachable to a vehicle;
an electric motor provided in the housing to operate in response to an operation of an input rod connected to a brake pedal;
a propulsion mechanism provided in the housing, and driven by the electric motor to rectilinearly propel a piston in a master cylinder;
a pressing member provided between the piston and the propulsion mechanism, the pressing member being movable relative to a rectilinearly moving member of the propulsion mechanism, the pressing member being movable by either one of the input rod and the propulsion mechanism to press the piston at a distal end of the pressing member; and
a reaction force generating mechanism having a coil spring supported at one end thereof by the housing, the coil spring being connected at the other end thereof with the input rod, the reaction force generating mechanism applying a reaction force against the operation of the input rod,
the pressing member being movable together with the rectilinearly moving member by the propulsion mechanism with a gap between the input rod and the pressing member, or caused to abut against the input rod due to movement of the input rod and moved while separated from the rectilinearly moving member, and
the pressing member having a proximal end disposed closer to the input rod than the one end of the coil spring that is supported by the housing.

13. The electric motor-driven booster of claim 12, wherein the proximal end of the pressing member is disposed inside the coil spring.

14. The electric motor-driven booster of claim 12, wherein the pressing member is slidably supported by a guide part provided closer to the master cylinder than the reaction force generating mechanism.

15. The electric motor-driven booster of claim 14, wherein the propulsion mechanism is a hollow rotation-rectilinear motion conversion mechanism provided in the housing on a same axis as the pressing member;
the guide part being provided on the rectilinearly moving member of the rotation-rectilinear motion conversion mechanism.

16. The electric motor-driven booster of claim 12, wherein the propulsion mechanism is a hollow rotation-rectilinear motion conversion mechanism provided in the housing on a same axis as the pressing member;
the coil spring and the rectilinearly moving member of the rotation-rectilinear motion conversion mechanism being disposed to overlap each other in an axial direction.

17. The electric motor-driven booster of claim 16, wherein the one end of the coil spring is disposed inside the rectilinearly moving member of the rotation-rectilinear motion conversion mechanism.

18. The electric motor-driven booster of claim 12, wherein the proximal end of the pressing member is disposed axially apart from a distal end of the input rod at least when the brake pedal is not operated.

19. An electric motor-driven booster comprising:
a housing attachable to a vehicle;
an electric motor provided in the housing so as to operate in response to an operation of an input rod connected to a brake pedal;
a hollow rotation-rectilinear motion conversion mechanism having a rectilinearly moving member provided in the housing on a same axis as the input rod, the rectilinearly moving member being driven by the electric motor to propel a piston in a master cylinder;
a reaction force generating mechanism having a coil spring supported at one end thereof by the housing, the coil spring being connected at the other end thereof with the input rod, the reaction force generating mechanism applying a reaction force against the operation of the input rod; and
a pressing member provided between the piston and the rotation-rectilinear motion conversion mechanism, the pressing mechanism being movably relative to the rectilinearly moving member, the pressing member being movable by either one of the input rod and the rectilinearly moving member to press the piston at a distal end of the pressing member,
the pressing member being movable together with the rectilinearly moving member by the propulsion mechanism with a gap between the input rod and the pressing member, or caused to abut against the input rod due to movement of the input rod and moved while separated from the rectilinearly moving member, the pressing member being slidably supported by a guide part provided on the rectilinearly moving member at a position closer to the master cylinder than the reaction force generating mechanism, and the pressing member having a proximal end disposed closer to the input rod than the one end of the coil spring that is supported by the housing.

20. The electric motor-driven booster of claim 19, wherein the proximal end of the pressing member is disposed axially apart from a distal end of the input rod at least when the brake pedal is not operated.

* * * * *